United States Patent
Richards

(10) Patent No.: US 12,467,327 B1
(45) Date of Patent: Nov. 11, 2025

(54) INLINE BISTABLE VALVE ARRANGEMENT FOR OILFIELD DRILLING TOOLS

(71) Applicant: Schlumberger Technology Corporation, Sugar Land, TX (US)

(72) Inventor: Edward Richards, Cheltenham (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/883,645

(22) Filed: Sep. 12, 2024

(51) Int. Cl.
*E21B 7/06* (2006.01)
*E21B 21/10* (2006.01)

(52) U.S. Cl.
CPC ............... *E21B 21/10* (2013.01); *E21B 7/06* (2013.01); *E21B 2200/01* (2020.05)

(58) Field of Classification Search
CPC ......... E21B 21/10; E21B 7/06; E21B 2200/01
USPC ....................................................... 166/66.6
See application file for complete search history.

(56) References Cited

U.S. PATENT DOCUMENTS

| | | | | |
|---|---|---|---|---|
| 4,792,000 | A * | 12/1988 | Perkin | E21B 10/22 175/347 |
| 8,602,104 | B2 * | 12/2013 | Polyntsev | E21B 34/06 166/316 |
| 9,435,157 | B2 * | 9/2016 | Polyntsev | F16K 11/044 |
| 10,613,553 | B2 * | 4/2020 | van der Merwe | F16K 31/003 |
| 2004/0113731 | A1 * | 6/2004 | Moyer | H01F 7/1615 335/220 |
| 2005/0109542 | A1 * | 5/2005 | Downton | E21B 17/1014 175/73 |
| 2008/0142269 | A1 * | 6/2008 | Richards | E21B 7/062 335/220 |
| 2009/0020293 | A1 * | 1/2009 | Richards | E21B 34/066 166/381 |
| 2012/0145458 | A1 * | 6/2012 | Downton | E04D 13/165 175/231 |

* cited by examiner

Primary Examiner — Taras P Bemko
(74) Attorney, Agent, or Firm — Jeffrey D. Frantz

(57) ABSTRACT

A system includes a bottom hole assembly (BHA), including at least one valve including a bistable actuator coupled to a stem having a valve element, wherein the bistable actuator is configured to move the stem along an axial path of travel to position the valve element in an open position or a closed position relative to a valve seat. The at least one valve also includes a pressure-compensated seal disposed about the stem, wherein the pressure-compensated seal is disposed between an interior fluid chamber and a fluid flow path through the at least one valve.

20 Claims, 7 Drawing Sheets

INLINE BISTABLE VALVE ARRANGEMENT FOR OILFIELD DRILLING TOOLS

BACKGROUND

The present disclosure generally relates to tools used to maneuver a drill bit while directional drilling for resource procurement.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

To meet consumer and industrial demand for natural resources, companies often invest significant amounts of time and money in searching for and extracting oil, natural gas, hydrocarbons, and other subterranean resources from the earth. Particularly, once a desired subterranean resource such as oil or natural gas is discovered, drilling and production systems are often employed to access and extract the resource. These systems may be located onshore or offshore depending on the location of a desired resource. Common methods include deploying the drilling and production systems on the surface or on a floating platform disposed above the discovered resources, and drilling a borehole straight down into the surface of the earth to procure the desired resource(s).

However, in some scenarios, desired resources may be located such that it is inconvenient to dispose the drilling and production systems on the surface directly above the resources. In these cases, it may be beneficial to set up the drilling and production systems in a location laterally spaced from the location of the desired resources and employ directional drilling techniques. While employing directional drilling techniques, operators are able to drill straight down below the surface of the earth, and then maneuver the drill bit to curve the drill bit along a prescribed arc to direct the drill bit towards the desired resources. Efforts to improve the efficiency and maneuverability of these drill bits during drilling operations may be advantageous.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

In certain embodiments, a system includes a bottom hole assembly (BHA) having a drill bit configured to rotate and drill a borehole in a subterranean formation. The BHA further includes a rotary steerable system (RSS) having a plurality of steering pads and a plurality of fluid actuators, wherein each steering pad of the plurality of steering pads is fluidly coupled to a fluid actuator of the plurality of fluid actuators. The BHA further includes a valve assembly having a plurality of valves, wherein each valve of the plurality of valves is fluidly coupled to one of the plurality of fluid actuators. At least one valve of the plurality of valves includes a bistable actuator coupled to a stem having a valve element, wherein the bistable actuator is configured to move the stem along an axial path of travel to position the valve element in an open position or a closed position relative to a valve seat. The at least one valve also includes a pressure-compensated seal disposed about the stem, wherein the pressure-compensated seal is disposed between an interior fluid chamber and a fluid flow path through the at least one valve.

In certain embodiments, a system includes a bottom hole assembly (BHA), including at least one valve including a bistable actuator coupled to a stem having a valve element, wherein the bistable actuator is configured to move the stem along an axial path of travel to position the valve element in an open position or a closed position relative to a valve seat. The at least one valve also includes a pressure-compensated seal disposed about the stem, wherein the pressure-compensated seal is disposed between an interior fluid chamber and a fluid flow path through the at least one valve.

In certain embodiments, a method includes adjusting fluid flow with at least one valve of a bottom hole assembly (BHA), wherein the at least one valve includes a bistable actuator coupled to a stem having a valve element, and the bistable actuator is configured to move the stem along an axial path of travel to position the valve element in an open position or a closed position relative to a valve seat. The method further includes pressure balancing via a pressure-compensated seal disposed about the stem, wherein the pressure-compensated seal is disposed between an interior fluid chamber and a fluid flow path through the at least one valve.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness. These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
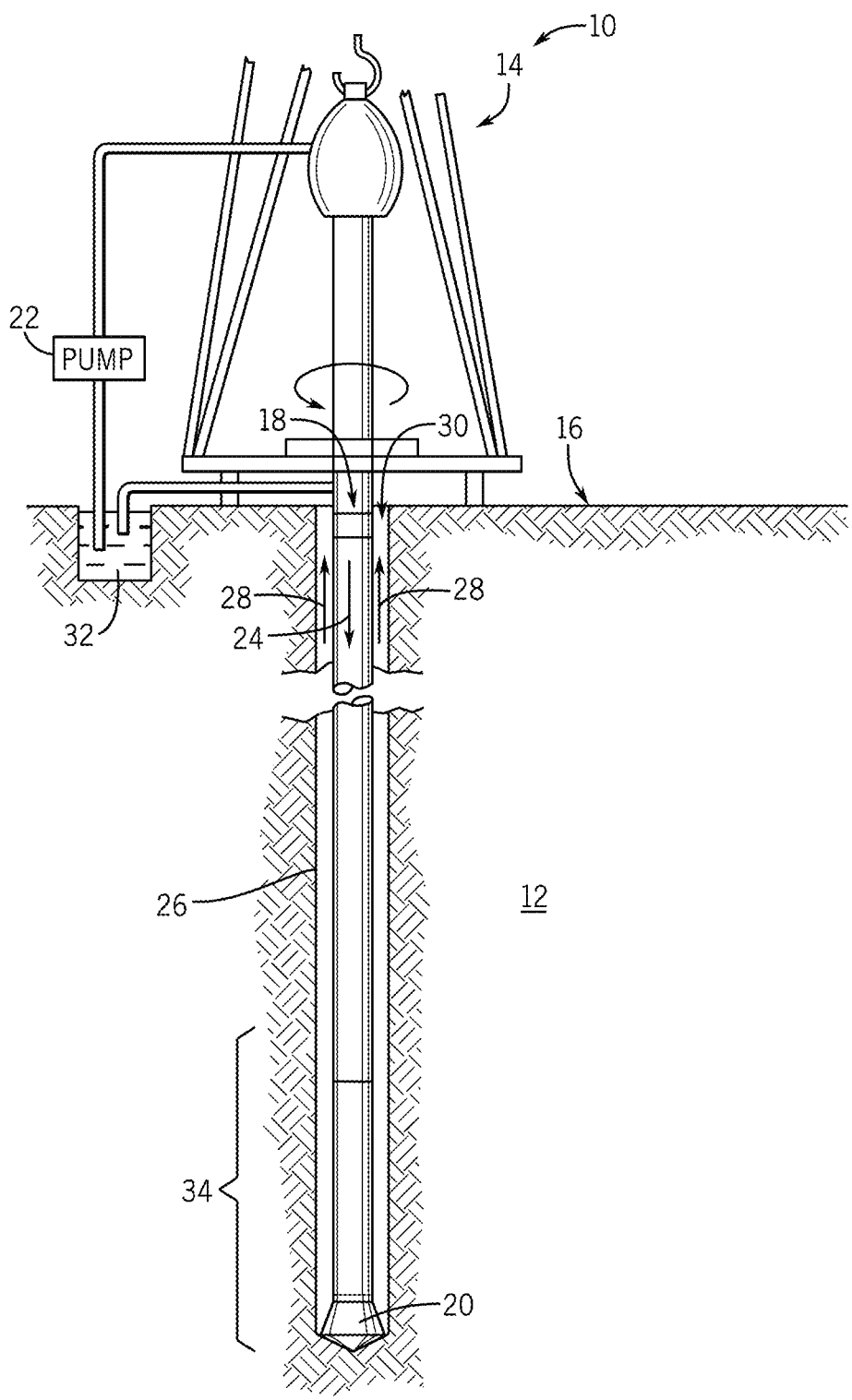
FIG. 1 is a schematic view of a drilling system including a downhole tool string, in accordance with aspects of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Certain terms are used throughout the description and claims to refer to particular features or components. As one skilled in the art will appreciate, different persons may refer to the same feature or component by different names. This document does not intend to distinguish between components or features that differ in name, but not function.

For decades, humans have relied on resources found below the earth's surface to meet increasing energy demands. These resources include but are not limited to natural gas, coal, hydrocarbons, petroleum, and other materials suitable to generate energy for consumption by humans. As energy demands increase, significant efforts are expended to extract an appropriate supply of energy to meet the increasing demand. Included in these efforts are systems and methods that enable expanded extraction of the resources, increase the efficiency of the extraction process, and technological advances that permit extraction and exploration in areas that were previously inaccessible for energy production. Recently, one area of exploration that has grown with the advance of energy exploration related technology is the extraction of resources from a portion of the earth's surface where it is not feasible to dispose drilling and production facilities directly above the subterranean resources.

As one might expect, extracting resources from an area below the earth's surface without being able to drill straight down introduces additional challenges that might not necessarily be present when extracting resources from the earth in a conventional manner. For example, operators may calculate a location for the drilling and production facilities sufficiently laterally spaced from the resources, and determine an arc profile path so that they may maneuver the drill bit and accompanying drill string along the determined path to approach the desired resources from the side, rather than from above. While traditional resource procurement systems may not require equipment configured to direct the drill bit along an arc-shaped path, directional drilling systems utilize an array of drill bits, valves, actuators, motors, seals, sensors, control systems, and other components that work together as part of a bottom hole assembly (BHA) to enable the operator to direct the drilling components along the determined path though the subterranean formations. Methods for directional drilling and the arc profile paths taken during operation are often constrained by the geometrical aspects of the equipment utilized during the directional drilling process. For example, certain length ratios and diameter ratios restrict the performance and the shape of the arcs an operator is allowed to chart for a particular directional drilling operation. When drilling for resources, operators may desire drilling tools with a relatively smaller outside diameter for improved maneuverability characteristics. As a result, efforts to arrange components in the BHA to enable improved maneuverability and agility of the directional drilling system may be advantageous.

The present disclosure relates to a valve design and valve arrangement in the bottom hole assembly directional drilling system such that a drilling tool provides agile steering performance of a smaller diameter tool. Present embodiments include the BHA with a rotary steerable system (RSS) having multiple valves configured to regulate and distribute drilling fluid to steering pads in a steering pad assembly. Each valve may be a bistable valve having a bistable actuator coupled to a valve (e.g., shuttle valve) in single-sided valve arrangement with a pressure-compensated seal. The bistable valve is configured to include two stable positions (e.g., open position and closed position), and once the bistable valve is actuated to move into one of the two stable positions, no additional energy is required to maintain the bistable valve in that position. Thus, the bistable valve provides energy savings and stability as compared with other valves, such as solenoid-driven valves, that require energy to maintain at least one of the positions. Additionally, the bistable valve includes the valve (e.g., shuttle valve) in the single-sided valve arrangement, wherein the valve is coupled to a shaft extending from only one end of the bistable actuator rather than a double-sided valve arrangement with valves coupled to shafts extending from opposite ends of the bistable actuator. In other words, the disclosed embodiments of the bistable valve include only one valve (i.e., a single valve) coupled to a single shaft on a single end of the bistable actuator, and exclude bistable valves with valves on both ends of the bistable actuator. Additionally, the bistable valve includes a pressure-compensated seal between the bistable actuator and the valve (e.g., shuttle valve), such as a movable seal element (e.g., piston, flexible barrier or diaphragm, etc.) between an internal fluid reservoir and an external fluid (e.g., a fluid flow path through the bistable valve). Thus, the single-sided valve arrangement, the pressure-compensated seal, and the bistable actuator provide improved sealing, stable positioning and a compact arrangement suitable for use in the RSS drilling tool as discussed in further detail below.

In the present disclosure, the valves (e.g., bistable valves) may be used in a series arrangement, a parallel arrangement, or a combination thereof, depending on the particular geometrical constraints. For example, in the embodiments discussed below, the RSS drilling tool has a comparatively smaller diameter, and by extension a smaller second moment of area, than certain RSS drilling tools, thereby enabling the RSS drilling tool to drill a comparatively smaller diameter pilot hole along a tighter curved trajectory, as a result of its geometry. In certain applications, when the RSS drilling tool may not be subject to such geometrical constraints, the plurality of mud control valves may be arranged in a triangular arrangement (e.g., parallel arrangement of valves in a triangular pattern), and each individual mud control valve may be individually fluidly connected to an associated steering pad of the steering pad assembly. As a result of this triangular arrangement, the overall diameter of the arrangement may not fall below a diameter threshold desired for an RSS tool with improved agility and maneuverability characteristics. However, certain embodiments provide for an in-line mud control valve arrangement such that the plurality of mud control valves are arranged end to end with one another (e.g., series arrangement of valves that are coaxial), thereby enabling the plurality of mud control valves to assemble into an RSS tool with a diameter below the diameter threshold. In part, present embodiments also include a manifold configured to maintain the functionality of each mud control valve fluidly connected to a corresponding steering pad of the steering pad assembly. Taken together, present embodiments provide the operator the capability to enjoy the benefits of a more agile, maneuverable directional drilling system that is configured to drill tighter, more precise arc trajectories during operation.

Turning to the drawings, FIG. 1 illustrates a drilling system 10 (e.g., subterranean drilling system) that may be used to drill a well through subterranean formations 12 to extract various fluids (e.g., oil, natural gas, or hydrocarbon containing fluids). In the illustrated embodiment, a drilling rig 14 at the surface 16 may rotate a drill string 18, which includes a drill bit 20 at its lower end to engage the subterranean formations 12. The drilling system 10 is configured to rotate the drill bit 20 to cut a vertical borehole 26 in the subterranean formations 12, and in certain embodiments, the drilling system 10 is configured to rotate the drill bit to cut a curved borehole in the subterranean formations 12. To cool and/or lubricate the drill bit 20, a drilling fluid pump 22 may pump drilling fluid 28, commonly referred to as "mud" or "drilling mud," from a mud pit 32, downward through the center of the drill string 18 in the direction of the arrow 24 to the drill bit 20. In addition to cooling and lubricating, as discussed in further detail below, the drilling fluid 28 may also facilitate the drill bit 20 turning and cutting the curved borehole. At the drill bit 20, the drilling fluid 28 may then exit the drill string 18 through ports (not shown) and flow into the borehole 26. While drilling, the drilling fluid 28 may be pushed toward the surface 16 through an annulus 30 between the drill string 18 and the formation 12, thereby carrying drill cuttings away from the bottom of the borehole 26. Once at the surface 16, the returned drilling fluid 28 may be filtered and conveyed back to the mud pit 32 for reuse. Additionally, the drilling fluid 28 may exert a mud pressure on the formation 12 to reduce likelihood of fluid from the formation 12 leaking into the borehole 26 and/or out to the surface 16. Further, a bottom hole assembly (BHA) 34 includes various components that operate together as part of the drilling system 10, as discussed in further detail below. The drilling system 10 may be configured to rotate the drill bit 20 to cut a curved, or an arc-shaped path to reach subterranean resources that are not located directly below the drilling and production facilities.

Figure 2:
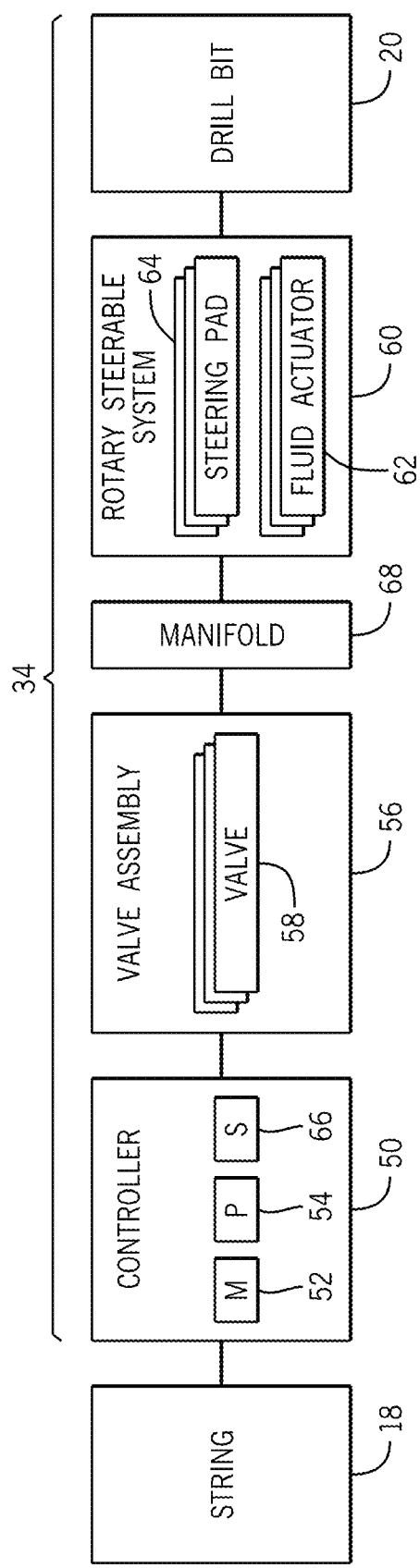
FIG. 2 is a block diagram of a bottom hole assembly (BHA) configured to perform drilling operations, in accordance with aspects of the present disclosure.

FIG. 2 illustrates a schematic view of an embodiment of the BHA 34 that enables the drilling system 10 to cut the arc-shaped path through the subterranean formations 12. In the illustrated embodiment, the BHA 34 is coupled to a lower end of the drill string 18, and may include a controller 50, a valve assembly 56, a manifold 68, a rotary steerable system (RSS) 60, and the drill bit 20. The BHA 34 is configured to receive instructions (e.g., drilling parameters, drilling fluid flow values, drill bit rotational speeds, etc.) from a user and/or a surface control system on the surface 16, and output the instructions to the other components via the controller 50. In certain embodiments, the controller 50 may automatically determine instructions to output to the other components of the BHA 34 based on feedback signals received from the other components.

The controller 50 is connectively coupled to the drill string 18 and fluidly coupled to the valve assembly 56. In the illustrated embodiment, the controller 50 includes a memory 52, a processor 54, and a sensor 66 (e.g., the sensor 66 is coupled to the controller 50) that are configured to work together to provide instructions to the various components of the BHA 34. For example, the controller 50 may be programmed (e.g., via computer readable code or instructions stored on the memory 52, such as a non-transitory computer readable medium, and executable by the processor 54 and/or by circuit design of an ASIC) to provide signals for controlling the various components of the BHA 34 (e.g., the valve assembly 56, the rotary steerable system 60, a motor (e.g., electric motor or fluid-driven motor) coupled to the drill bit 20, etc.). In certain embodiments, the controller 50 may be programmed according to a specific configuration desired for a particular application. Additionally or alternatively, the sensor 66 (e.g., any number, type, or configuration of sensors) may be configured to detect external inputs, reference signals, or other suitable signals that are indicative of the performance of the BHA 34. In a non-limiting embodiment, the controller 50 may be configured to respond to external inputs and reference signals detected by the sensor 66, and the controller 50 may be configured to respond in a programmed or pre-determined manner according to a set of operating parameters. For example, the operating parameters may determine the speed or torque of the drill bit 20, a fluid volume of fluid flow rate of drilling fluid 28 to the rotary steerable system 60, or may determine how the controller 50 responds to various external inputs detected by the sensor 66. With feedback data from the sensor 66, the controller 50 may keep detailed track of the various conditions under which the BHA 34 is operating. For example, the feedback data may include conditions such as drill bit speed, voltage, frequency, drilling fluid flow conditions, power quality, alarm conditions, etc. In some embodiments, the feedback data may be communicated back to one or more computing devices of the surface control system located on the surface 16 for additional analysis.

In the illustrated embodiment, the controller 50 is communicatively coupled to the valve assembly 56. The valve assembly 56 includes a plurality of individual valves 56 that assemble together to make up the valve assembly 56. In the illustrated embodiment, the valve assembly includes three (3) individual bistable valves 58, such as single actuating bistable mud control valves. However, in other embodiments, the valve assembly 56 may include greater or fewer (e.g., 2, 4, 5, 6, 7, 8, etc.) individual bistable valves 58. Additionally or alternatively, the valve assembly 56 is fluidly coupled to the RSS 60 via the manifold 68, as discussed in further detail below. In certain embodiments, the individual bistable valves 58 are fluidly coupled to an associated fluid actuator 62, and by extension, fluidly coupled to an associated steering pad 64 of the rotary steerable system 60. As discussed in detail below, each of the bistable valves 58 may be a bistable valve having a bistable actuator coupled to a valve (e.g., shuttle valve) in single-sided valve arrangement with a pressure-compensated seal. For example, in certain embodiments, each bistable valve 58 (e.g., bistable valve) includes only one valve (i.e., a single valve) coupled to a single shaft on a single end of the bistable actuator, and excludes bistable valves with valves on both ends of the bistable actuator. Additionally, the pressure-compensated seal is positioned between the bistable actuator and the valve (e.g., shuttle valve), such that an internal fluid is pressure balanced with an external fluid. Additional details of the bistable valves 58 are discussed below.

The geometric arrangement and construction of the individual bistable valves 58 as part of the valve assembly 56 contributes to the ability for the valve assembly 56 to assemble into an RSS 60 that is below a threshold diameter to enable agility and maneuverability of the RSS, and by extension, the BHA 34. As discussed previously, in certain embodiments, the individual bistable valves 58, when assembled as part of a three (3) valve configuration, would assemble in a triangular configuration (e.g., parallel arrangement of bistable valves 58 in a triangular pattern), with each of the individual valves making up a vertex of the triangular configuration. However, in certain embodiments, the individual valves may be assembled in the valve assembly 56 in an in-line configuration (e.g., series arrangement of bistable valves 58 that are coaxial), such that each valve lays end-to-end with one another, as discussed in further detail in FIG. 5. By virtue of this in-line configuration, the valve assembly 56 may fit into the BHA 34 under the threshold envelope diameter to enable improved directional drilling performance. However, in the embodiments discussed below, the bistable valves 58 may be used in any suitable configuration including but not limited to the in-line configuration (e.g., series arrangement), the triangular configuration (e.g., parallel arrangement), or any combination thereof.

The manifold 68 is configured to direct flow from the bistable valves 58 of the valve assembly 56 to the RSS 60. As discussed in further detail below, the manifold 68 is configured to fluidly couple the individual bistable valves 58 of the valve assembly 56 with the RSS 60. As illustrated, the RSS 60 is fluidly coupled to the valve assembly 56 via the manifold 68 and coupled to the drill bit 20. The RSS 60 includes a plurality of fluid actuators 62 and a plurality of steering pads 64 as part of a steering pad assembly. Additionally, the RSS 60 is configured to rotate directly with rotation of the drill string 18 and receive drilling fluid 28 from the valve assembly 56. In certain embodiments, the RSS 60 may be configured to rotate with the drill bit 20, however, in some embodiments, the RSS 60 may include a motor (e.g., an electric motor or a fluid-driven motor) configured to alter (e.g., increase or decrease) the rotational speed of the drill bit 20 relative to the RSS 60. More specifically, the RSS 60 is configured to receive drilling fluid from the individual bistable valves 58 of the valve assembly 56, and utilize the output drilling fluid to activate the fluid actuators 62 to distribute the drilling fluid to the steering pads 64.

In the illustrated embodiment, the fluid actuators 62 are included as part of the RSS 60. An individual fluid actuator 62 is configured to fluidly couple with a corresponding bistable valve 58 of the valve assembly 56. In certain embodiments, the RSS 60 may include three (3) fluid actuators 62 that are configured to utilize received drilling fluid 28 from the bistable valves 58 to actuate the steering pads 64. In other embodiments, the RSS 60 may include greater or fewer fluid actuators 62 (e.g., 2, 4, 5, 6, 7, 8, etc.). The fluid actuators 62 may include a piston-cylinder assembly (e.g., piston that reciprocates with a cylinder) and a steering pad valve configured to control the actuation of the steering pad 64 along a particular direction of movement (e.g., radial actuation relative to an axial direction of the BHA 34). In a non-limiting embodiment, the steering pad valve of the fluid actuator 62 is fluidly coupled to an individual bistable valve 58 via a pressurized mud line.

The steering pads 64 are included as part of the RSS 60. An individual steering pad 64 of the steering pad assembly is configured to fluidly couple with a corresponding fluid actuator 62 of the RSS, and by extension, fluidly couple to a corresponding bistable valve 58 of the valve assembly 56. In certain embodiments, the RSS 60 may include three (3) steering pads 64 of the steering pad assembly that are configured to utilize received drilling fluid 28 from the fluid actuators 62. In other embodiments, the RSS 60 may include greater or fewer steering pads (e.g., 2, 4, 5, 6, 7, 8, etc.). The steering pads 64 are configured to receive drilling fluid from the fluid actuator 62 and the individual bistable valve 58 via the pressurized mud line, and thereby actuate the steering pad 64 along a movement path from a radially retracted position to a radially protruded position. In certain embodiments, the steering pad valve is configured to direct drilling fluid to a first side of a piston of the steering pad piston-cylinder assembly to actuate the piston to push the steering pad 64 into a radially protruded position. Additionally, the steering pad valve is configured to direct drilling fluid to a second side of the piston of the steering pad piston-cylinder assembly to actuate the piston to pull the steering pad 64 into a radially retracted position.

In a non-limiting embodiment, as the RSS 60 rotates with the drill bit 20, the RSS is configured to actuate the fluid actuator 62 (e.g., steering pad valve and steering pad piston-cylinder assembly) to drive the movement of the steering pad 64. For example, the RSS 60 actuates an individual steering pad 64 to push against the wall of the borehole 26 cut by the drill bit 20, thereby causing the drill bit 20 to cut the borehole 26 with a determined radius of curvature. In a non-limiting embodiment, the RSS 60 may actuate an individual steering pad 64 of the plurality of steering pads to radially protrude at a point of the rotation, such that the steering pad 64 radially extends at a position opposite of the determined cutting path of the drill bit 20.

Figure 3:
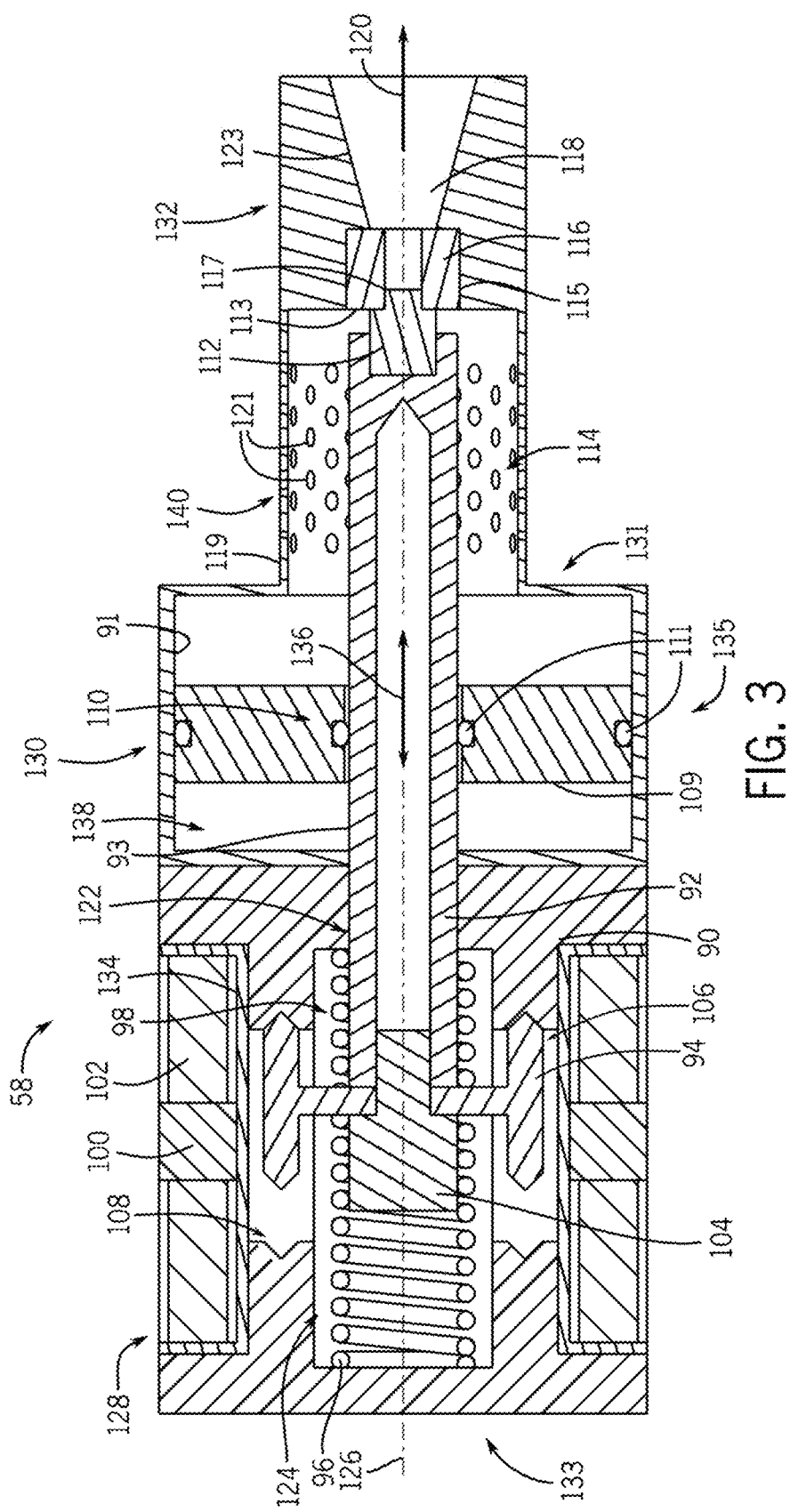
FIG. 3 is a schematic view of a bistable valve utilized in the BHA, in accordance with aspects of the present disclosure.

FIG. 3 illustrates a schematic view of an embodiment of a bistable valve 58 according to aspects of the present disclosure. As discussed above, the valve assembly 56 includes multiple bistable valves 58 that are arranged in a particular configuration as part of the bottom hole assembly 34. Each bistable valve 58 of the valve assembly 56 is configured to direct drilling fluid 28 to a fluid actuator 62 in the RSS 60, wherein the fluid actuator 62 is configured to radially actuate or move a steering pad 64 of the RSS 60. As the name suggests, the bistable valve 58 is configured to include two stable positions (e.g., open valve position and closed valve position), and once the bistable valve 58 is actuated to move into one of the two stable positions, no additional energy is required to maintain the bistable valve 58 in that position. For example, the bistable valve 58 may be in a first position configuration (e.g., closed valve position), such that drilling fluid 28 is prevented from flowing through the bistable valve 58, and the bistable valve 58 does not require any additional energy source to keep the bistable valve 58 in this first position configuration. Further, the bistable valve 58 may receive a signal output (electronic signal, magnetic signal, communication signal etc.) that is configured to actuate the bistable valve 58 from the first position configuration (e.g., closed valve configuration) to a second position configuration (e.g., open valve position) that enables drilling fluid to flow through the bistable valve 58. Once the bistable valve 58 is actuated to the second position configuration, no additional energy output (e.g., signal output) is required to maintain the bistable valve 58 in the second position configuration. In other words, the bistable valve 58 is configured to have two stable position configurations that the bistable valve 58 will maintain without a continuous energy supply to keep the bistable valve 58 in either position configuration.

In the illustrated embodiment, the bistable valve 58 includes an actuator or actuation portion 128 (e.g., bistable actuator), a sealing portion 130, and valve portion 132 (e.g., single-sided valve portion) on only a first axial side 131 (e.g., axial end) but not a second axial side 133 (e.g., axial end) of the bistable valve 58. In other words, the actuation portion 128, the sealing portion 130, and the valve portion 132 are part of a single-sided valve arrangement 135. The actuation portion 128 of the bistable valve 58 includes a housing 90 (e.g., annular housing), a shaft or stem 92, a magnetic element 94 (e.g., magnetically-permeable element), a first spring 96 (e.g., coil spring), a second spring 98 (e.g., coil spring), a magnet 100 (e.g., permanent magnet), a coil 102 (e.g., electromagnet), and a cap 104 (e.g., central hub). The magnetic element 94 may include an annular structure extending circumferentially around the stem 92 adjacent the cap 104. The magnet 100 may include an annular permanent magnet configured to generate a magnetic field (e.g., fixed magnetic field), wherein the magnet 100 extends circumferentially around the magnetic element 94 and the stem 92. The coil 102 may include an electromagnet configured to generate and control (e.g., vary a magnitude and direction of) a magnetic field in response to an applied current, wherein the coil 102 extends circumferentially around the magnetic element 94 and the stem 92. The actuation portion 128 includes the components of the bistable valve 58 that enable the valve to actuate between the two stable position configurations, and maintain the position without any continuous outside energy input to the bistable valve 58. As illustrated, the housing 90 is configured to surround the other components of the actuation portion 128 of the bistable valve 58 and provide a support structure for the other components assembled in the bistable valve 58. For example, the housing 90 includes an internal cylindrical cavity 124 positioned around a central axis 126 of the bistable valve 58 that is configured to house the first spring 96 and the second spring 98. In some embodiments, the housing 90 is made from a non-magnetic material (e.g., ceramic, aluminum, titanium, stainless steel, etc.). The housing 90 includes a hole 122 (e.g., central axial bore or opening) in a lower portion of the housing 90 that is configured to enable the stem 92 to slidably translate through the housing 90 in an axial direction along the central axis 126, as discussed in further detail below.

The stem 92 of the bistable valve 58 is configured to actuate between a first stable position 106 and a second stable position 108 along a direction of movement 136 (e.g., axial path of movement) that aligns with the central axis 126. In the illustrated embodiment, the stem 92 couples to the cap 104 at a first end of the stem 92 and couples to a plunger 112 at a second end of the stem 92. The plunger 112 includes a valve element, such as a shuttle valve, a plug, a cylindrical valve, a disc, a ball, or the like. In other words, the plunger 112 is configured to open and close against a restriction flow element 116. In the illustrated embodiment, the cap 104 includes threads that engage with mating threads in the first end of the stem 92, however, other coupling mechanisms (e.g., sliding pin, interference fit, quick connect and disconnect interface, etc.) are considered within the scope of the present disclosure. Regarding the first end of the stem 92, the magnetic element 94 is positioned at the first end of the stem 92, and is clamped so that the magnetic element 94 is fixed between the cap 104 and the first end of the stem 92 as the cap 104 engages with the first end of the stem 92. Thus, the magnetic element 94 is directly coupled to the first end of the stem 92 and is configured to apply a translational force to the stem 92 through this direct coupling interface.

Additionally or alternatively, the housing 90 is configured to provide a surface 134 (e.g., annular groove) to receive and support the coil 102 and the magnet 100. In the illustrated embodiment, the coil 102 is configured to wrap around the surface 134 (e.g., annular groove) of the housing 90 and receive a signal (e.g., electrical, communication, magnetic, etc.) from the controller 50 that is configured to control a current to the coil 102. For example, the controller 50 is configured to control a magnitude and direction of the current to the coil 102 (e.g., electromagnet) to control a magnitude and direction of a magnetic field generated by the coil 102. Additionally, the magnet 100 (e.g., permanent magnet) is configured to provide a magnetic field that is substantially constant and does not change in direction. In operation, the magnetic fields from the magnet 100 and the coil 102 are applied to the magnetic element 94 to provide magnetic forces, in combination with opposing spring forces from first and second springs 96 and 98, to control operation of the stem 92 and the plunger 112 (e.g., valve element) between open and closed positions.

For example, the magnitude and direction of the current supplied to the coil 102 to generate the magnetic field applied to the magnetic element 94 is configured to control movement of the stem 92 and the plunger 112, such as by moving the stem 92 and the plunger 112 from the open position to the closed position in response to current flow in a first direction, and by moving the stem 92 and the plunger 112 from the closed position to the open position in response to current flow in a second direction opposite to the first direction. By further example, the magnetic field provided by the magnet 100 (e.g., permanent magnet) and applied to the magnetic element 94 is configured to hold a position of the stem 92 and the plunger 112 (e.g., hold the open or closed position) after movement induced by the magnetic field provided by the coil 102. In certain embodiments, an applied permanent-magnet force by the magnet 100 (e.g., permanent magnet) on the stem 92 may be substantially zero (e.g., neutral position) when the magnetic element 94 is centrally located at an axial position aligned with the magnet 100 (e.g., intermediate position between open and closed position of plunger 112), whereas the applied permanent-magnet force by the magnet 100 on the stem 92 may be at a threshold level (e.g., maximum permanent-magnet force) to hold a position of the stem 92 and the plunger 112 (e.g., open or closed position) when the magnetic element 94 is axially offset in either direction away from the magnet 100. The threshold levels of the applied permanent-magnet force by the magnet 100 may cooperate with the spring forces by the first and second springs 96 and 98 to provide the stable positions of the stem 92 and the plunger 112 in the open and closed positions.

In operation, once the coil 102 is energized with current applied in the first or second direction, the stem 92 and the plunger 112 move along the direction of movement 136 between the first stable position 106 (e.g., closed position of the plunger 112) and the second stable position 108 (e.g., open position of the plunger 112), each of which is a stable position due to a balance of forces provided by the first and second springs 96 and 98 and the magnet 100 (e.g., permanent magnet). For example, if the stem 92 and magnetic element 94 are in the first stable position 106, by activating the coil 102, the stem 92 and magnetic element 94 may translate to the second stable position 108. Additionally or alternatively, if the stem 92 and magnetic element 94 are in the second stable position 108, by activating the coil 102, the stem 92 and magnetic element 94 may translate to the first stable position 106. As discussed previously, by virtue of the configuration of the bistable valve 58, the magnet 100 is configured to hold the stem 92 and magnetic element 94 in either the first or second stable position 106, 108, even after the controller has ceased supplying current to the coil 102.

In the illustrated embodiment, the first spring 96 and the second spring 98 are housed in the cavity 124 of the housing 90, and are configured to enact a biasing force to the stem 92 and magnetic interface 94 along the direction of movement 136. In a non-limiting embodiment, the first spring 96 and the second spring 98 are compression springs configured to enact an axial force along the direction of movement 136 that increases linearly in relation to a distance that the first spring 96 and/or second spring 98 is compressed. For example, in the illustrated embodiment, the first spring 96 is positioned on the left side of the stem 92 and magnetic element 94, and is configured to enact an axial force to push the stem 92 and magnetic element 94 into the first stable position 106. Conversely, in the illustrated embodiment, the second spring 98 is positioned on the right side of the stem 92 and the magnetic element 94, and is configured to enact an axial force to push the stem 92 and magnetic element 94 into the second stable position 108. In certain embodiments, when the stem 92 is in the first stable position 106, the axial force from the first spring 96 summed with the magnetic force from the magnet 100 is substantially equal to the axial force from the second spring 98. In some embodiments, when the stem 92 is in the second stable position 108, the axial force from the second spring 98 summed with the magnetic force from the magnet 100 is substantially equal to the axial force from the first spring 96.

Additionally, the seal portion 130 of the bistable valve 58 includes a dynamic seal assembly 110 configured to balance a pressure of an oil volume 138 (e.g., interior fluid chamber) with a pressure of the drilling fluid 28 that flows through the valve portion 132 during operation. In certain embodiments, the dynamic seal assembly 110 includes a seal element 109 (e.g., pressure-compensated seal) and one or more seals 111. For example, the seal element 109 may include an annular seal element, such as an annular or disc-shaped wall, a piston, or barrier. The seal element 109 may be configured to translate along an annular interior surface 91 of the housing 90 and an annular exterior surface 93 of the stem 92. Thus, the seal element 109 may include seals 111 (e.g., annular seals) along inner and outer annular surfaces of the seal element 109, which in turn seal against and translate along the annular interior surface 91 and the annular exterior surface 93. In some embodiments, the seal element 109 may include a flexible annular wall, such as a diaphragm or flexible barrier made of an elastomeric material.

In the illustrated embodiment, the dynamic seal assembly 110 is configured to translate axially along the direction of movement 136, thereby increasing or restricting the oil volume 138 that is adjacent to the actuation portion 128 of the bistable valve 58. For example, when the stem 92 is in the first stable position 106, the valve portion 132 of the bistable valve 58 is closed, thereby preventing pressurized drilling fluid 28 from flowing through the bistable valve 58. Additionally or alternatively, the dynamic seal assembly is configured to prevent fluids (e.g., oil from the oil volume 138, drilling fluid 28, etc.) from flowing from one side of the dynamic seal assembly to the other side. For example, in the illustrated embodiment, the dynamic seal assembly 110 is configured to ensure that an internal fluid (e.g., oil or lubricant) in the oil volume 138 stays on the left side of the dynamic seal assembly 110, and ensure that drilling fluid 28 stays on the right side of the dynamic seal assembly 110. In other words, the oil volume 138 (e.g., internal fluid chamber) is a sealed volume configured to retain a lubricant (e.g., oil) at least around the stem 92 and other lubricated areas of the actuation portion 128 (e.g., bistable actuator). For example, in certain embodiments, the oil volume 138 may extend through all or part of the actuation portion 128, such as through the internal cylindrical cavity 124 having the first spring 96, the second spring 98, and the cap 104, through an internal cavity having the magnetic element 94, through an internal cavity having the magnet 100 and the coil 102, or any combination thereof. The oil volume 138 is generally contained and sealed within the housing 90, wherein the dynamic seal assembly 110 operates to seal, separate the fluids, and pressure balance between the fluids along the stem 92.

Thus, in the illustrated embodiment, when the stem 92 is in the first stable position 106, the dynamic seal assembly 110 may translate to the right along the illustrated direction of movement 136, thereby increasing the oil volume 138 and reducing the pressure on the left side of the dynamic seal assembly 110. However, when the stem 92 is in the second stable position 108, and the valve portion 132 is opened, thereby enabling pressurized drilling fluid to flow through the valve portion 132 and bistable valve 58, the dynamic seal assembly 110 may translate to the left along the illustrated direction of movement 136. By translating to the left, the dynamic seal assembly 110 compresses the oil volume 138 adjacent to the actuator portion 128 of the valve, thereby increasing the pressure on the left side of the dynamic seal assembly 110. In some embodiments, the dynamic seal assembly 110 is configured to translate by an amount such that the pressure on the left side of the dynamic seal assembly 110 is substantially equal to the pressure on the right side of the dynamic seal assembly 110. In certain embodiments, the oil volume 138 is separate and individually compensated from other bistable valves 58 in the RSS 60, thereby ensuring that each oil volume is fluidly separate and isolated within the bistable valve 58.

The valve portion 132 of the bistable valve 58 includes a filter 114 (e.g., annular filter), a plunger 112 (e.g., valve element), a restriction flow element 116, and an expansion flow element 118. As discussed previously, the plunger 112 couples to the second end of the stem 92. When the stem 92 is in the first stable position 106, the plunger 112 is configured to interface with the restriction flow element 116 at a valve seat 113 (e.g., axially facing surface or seal interface). The restriction flow element 116 includes an annular body 115 having a central bore 117 (e.g., central fluid flow passage). In the illustrated embodiment, the plunger 112 and restriction flow element 116 interface creates a seal that prevents the drilling fluid 28 from flowing through the central bore 117 and the expansion flow element 118 of the valve portion 132 of the bistable valve 58. However, when the actuator portion 128 receives an energy input and the coil 102 is energized, and the stem 92 translates from the first stable position 106 to the second stable position 108, the plunger 112 disengages from the restriction flow element 116 and the valve portion 132 enables the drilling fluid to flow through the central bore 117 and the expansion flow element 118 of the valve portion 132 of the bistable valve 58. In some embodiments, the plunger 112 may be made from a sealing rubber, however other soft sealing materials (neoprene, cork gasket, compression seal, O-ring, etc.) may be utilized to create the seal in the plunger 112 and restriction flow element 116 interface. In other embodiments, the plunger may be made from hard sealing material (e.g., synthetic diamond, tungsten carbide, boron nitride, etc.).

The valve portion 132 receives drilling fluid through the filter 114 that is disposed at an inlet 140 of the bistable valve 58. The filter 114 may be a perforated annular filter, screen, or cage. The filter 114 includes an annular wall 119 having a plurality of cutouts or openings 121 configured to prevent solids over a threshold size from flowing through the bistable valve 58. For example, in some embodiments, the filter 114 may be configured to include cutouts or openings 121 spaced apart from one another such that solids above a threshold size (1 micron, 10 microns, 100 microns, etc.) may be trapped by the filter 114 and blocked from flowing through the bistable valve 58. The filter 114 is configured to enable the bistable valve 58 or other downstream components (e.g., steering pads 64, fluid actuators 62, etc.) to not become clogged with contaminating solids.

In the illustrated embodiment, when the stem 92 is in the second stable position 108 and the drilling fluid is enabled to flow through the valve portion 132 of the bistable valve 58, the restriction flow element 116 and the expansion flow element 118 are configured to modify and adjust the pressure of the drilling fluid flow 120 exiting the bistable valve 58. In a non-limiting embodiment, the restriction flow component 116 is configured to direct the drilling fluid to expand into and through the expansion flow element 118. For example, the expansion flow element 118 may include a diverging passage 123, such as a diverging annular passage (e.g., frustoconical passage). In some embodiments, the combination of the restriction flow element 116 and the expansion flow element 118 enable the drilling fluid flow 120 to enter the fluid actuator 62 and steering pads 64 of the RSS 60 at a determined pressure and flow rate that is optimal for operation of the RSS 60.

Figure 4:
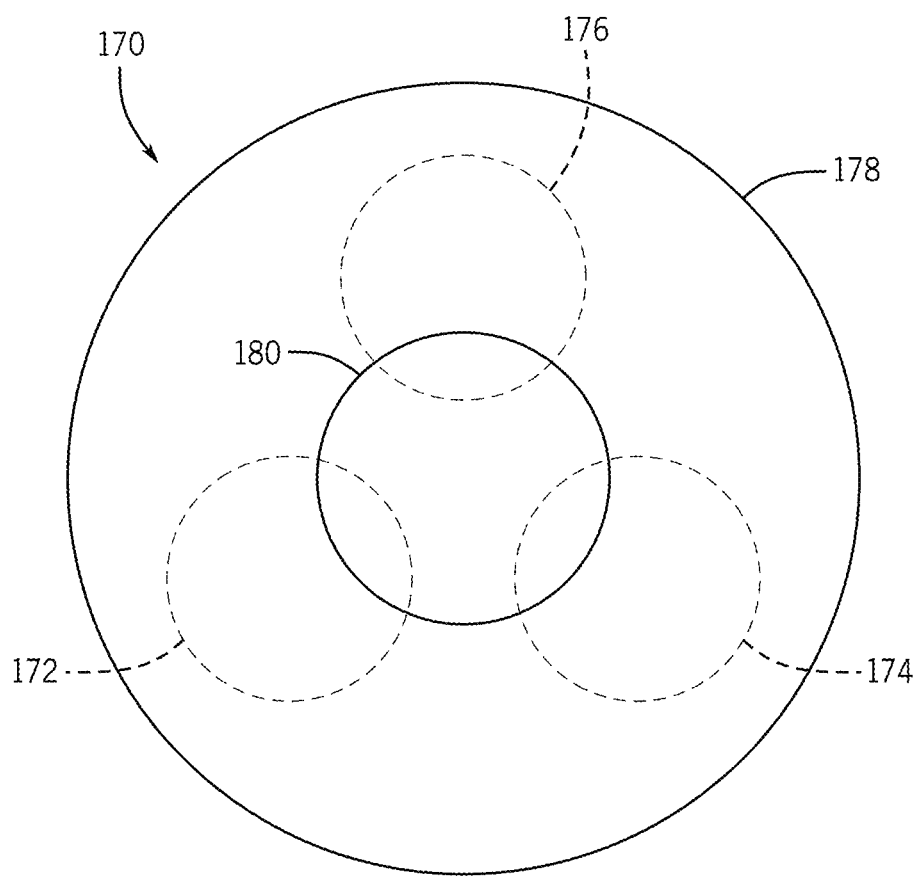
FIG. 4 is an end view of an embodiment of a parallel arrangement of multiple bistable valves utilized in the BHA, in accordance with aspects of the present disclosure.

FIG. 4 illustrates an end view of an embodiment of a parallel arrangement 170 of a plurality of bistable valves 58 in a valve assembly 56 in accordance with FIGS. 1-3. As shown, a first bistable valve 58, 172, a second bistable valve 58, 174, and a third bistable valve 58, 176 are arranged in a triangular, parallel configuration. In this parallel arrangement 170, the first bistable valve 58, 172, second bistable valve 58, 174, and third bistable valve 58, 176 are configured to assemble and fit within a threshold value of an outside circumferential surface 178 of the parallel arrangement 170. Additionally, the first bistable valve 58, 172, second bistable valve 58, 174, and third bistable valve 58, 176 are configured to output drilling fluid through the outlet 180, which in turn is configured to direct the pressurized drilling fluid to the downstream components of the BHA 34. In the present disclosure, an arrangement of a plurality of bistable valves 58 is desired to reduce the threshold value of the outside circumferential surface 178.

Figure 5:
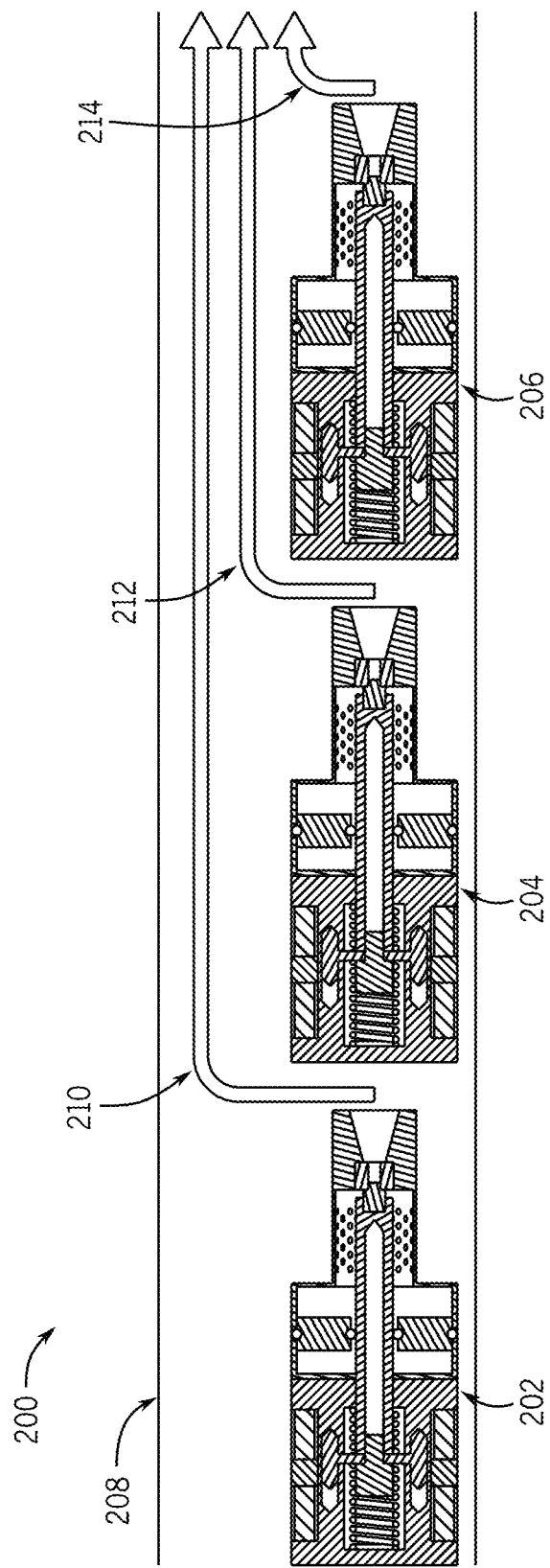
FIG. 5 is a schematic view of an embodiment of a linear arrangement of multiple bistable valves utilized in the BHA, in accordance with aspects of the present disclosure.

FIG. 5 illustrates a schematic view of an embodiment of an in-line series arrangement 200 of the plurality of bistable valves 58 in a valve assembly 56 in accordance with FIGS. 1-3, further illustrating the in-line series arrangement. In the illustrated embodiment, as opposed to embodiments where the bistable valves 58 are arranged in parallel, the bistable valves 58 are arranged axially in series and coaxial with one another (e.g., end to end with one another), thereby enabling the in-line series arrangement 200 to assemble into a smaller threshold diameter for the BHA 34. As illustrated, a first bistable valve 58, 202 is configured to output drilling fluid along a first outlet path 210, a second bistable valve 58, 204 is configured to output drilling fluid along a second outlet path 212, and a third bistable valve 58, 206 is configured to output drilling fluid along a third outlet path 214. In the illustrated embodiment, the first outlet path 210, the second outlet path 212, and the third outlet path 214 are arranged to align in the same plane. However, in certain embodiments, the first bistable valve 202, second bistable valve 204, and third bistable valve 206 may be oriented in a circumferentially spaced arrangement, such that the first outlet path 210, the second outlet path 212, and the third outlet path 214 are angularly spaced around a circumference of the in-line series arrangement 200. In some embodiments, the angle between the first outlet path 210 and the second outlet path 212 is substantially equal to the angle between the first outlet path 210 and the third outlet path 214. For example, the bistable valves in the in-line series arrangement 200 may be arranged such that the angle between the first outlet path 210 and the second outlet path 212 is 120 degrees. Each of the first, second, and third outlet paths 210, 212, and 214 may generally extend in an axial direction along a central axis of the valve assembly 56, and thus the first, second, and third outlet paths 210, 212, and 214 may be parallel in the axial direction and circumferentially spaced about the central axis.

By virtue of the in-line series arrangement of the plurality of bistable valves 202, 204, 206, the outer circumferential surface 208 of the BHA 34 may fit below a diameter threshold for increased agility and maneuverability. For example, in some embodiments, the diameter threshold for a desired in-line series arrangement may be 2 inches (in), 2⅝ in, 3 in, 3½ in, 4 in, or otherwise suitable value.

Figure 6:
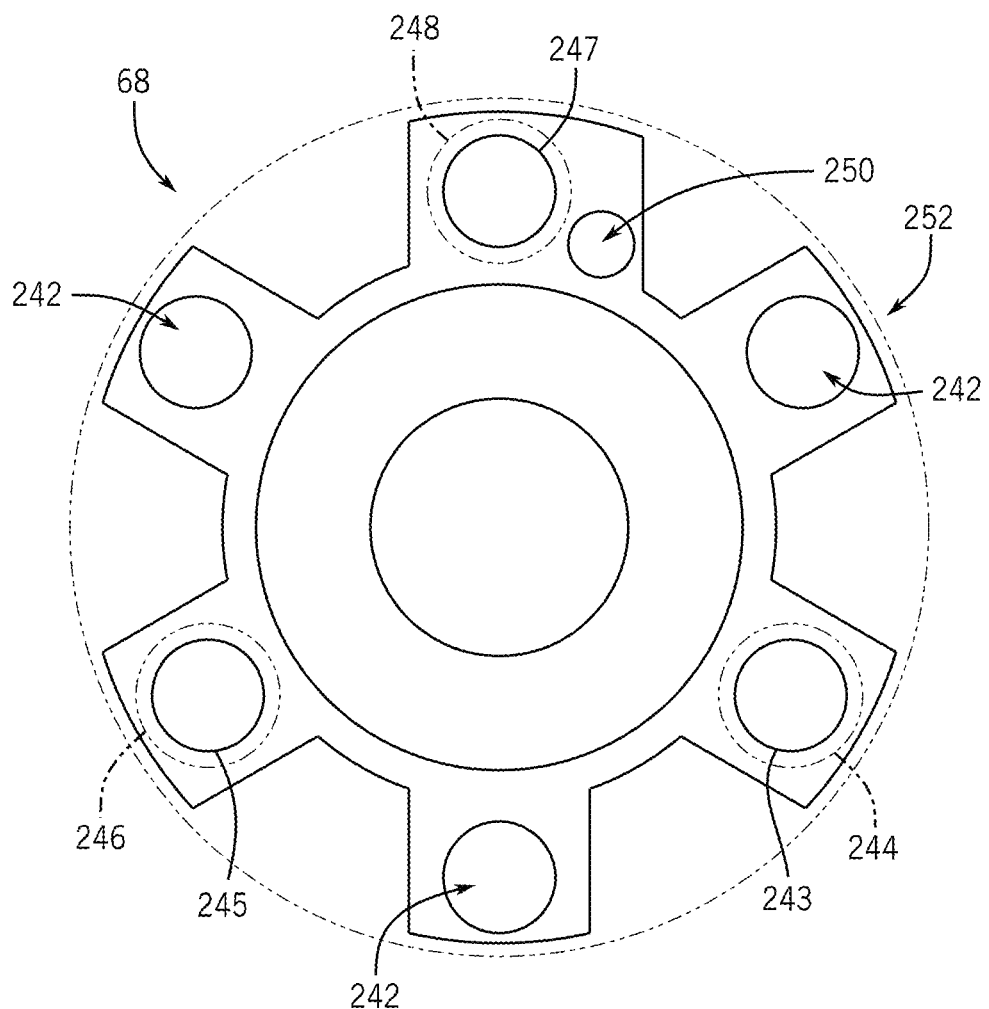
FIG. 6 is a cross-sectional view of an embodiment of a manifold configured to direct drilling fluid from a plurality of bistable valves to a plurality of steering pads of the BHA, in accordance with aspects of the present disclosure.

FIG. 6 illustrates a section view through an embodiment of the manifold 68 of the BHA 34 of FIGS. 1-3, further illustrating the components and passages of the manifold 68 that is configured to direct the output flows from the first, second, and third outlet paths 210, 212, 214 from the plurality of bistable valves 58 (e.g., 202, 204, and 206) to the components of the RSS 60. The manifold 68 includes a plurality of bolt holes 242, a first manifold path 243 (e.g., coupled to first outlet path 210) directed to a first steering pad 244, a second manifold path 245 (e.g., coupled to second outlet path 212) directed to a second steering pad 246, a third manifold path 247 (e.g., coupled to third outlet path 214) directed to a third steering pad 248, and an electrical conduit 250. The manifold 68 is configured to assemble between the valve assembly 56 and the RSS 60 of the BHA 34, and as discussed above, fluidly couple the individual bistable valves 58 of the valve assembly 56 with the RSS 60. In the illustrated embodiment, the bolt holes 242 are configured to enable the manifold 68 to couple to the bottom of the valve assembly 56. The bolt holes 242 are configured to accept a fastener (e.g., capscrew, bolt, stud, all-thread bar, etc.) that may be utilized to couple the manifold 68 to the valve assembly 56. In the illustrated embodiment, the manifold 68 includes three (3) bolt holes, however greater or fewer bolt holes (2, 4, 5, 6, 7, 8, etc.) are considered within the scope of the present disclosure. In some embodiments, the number of bolt holes 242 directly corresponds to the number of steering pads 64 and bistable valves 58 included in the BHA 34.

In the illustrated embodiment, the first manifold path 243 (e.g., coupled to first outlet path 210) directed to the first steering pad 244, the second manifold path 245 (e.g., coupled to second outlet path 212) directed to the second steering pad 246, and the third manifold path 247 (e.g., coupled to third outlet path 214) directed to the third steering pad 248 are shown to be equally spaced angularly around a circumference of the manifold 68. The first manifold path 243 is configured to direct pressurized drilling fluid from the first bistable valve 202 and the first outlet path 210 to a first steering pad 244. Additionally or alternatively, the second manifold path 245 is configured to direct pressurized drilling fluid from the second bistable valve 204 and the second outlet path 212 to a second steering pad 246. Further, the third manifold path 247 is configured to direct pressurized drilling fluid from the third bistable valve 206 and the third outlet path 214 to a third steering pad 248. The manifold 68 is configured to include the aforementioned manifold paths 243, 245, and 247, and maintain an outer circumferential surface 252 of the manifold 68 to be smaller than the threshold diameter of the desired BHA 34.

Additionally, the manifold 68 includes an electrical conduit 250 configured to provide a thoroughfare to electronically couple electrical components of the BHA 34. For example, in certain embodiments, the controller 50 may be configured to communicatively couple with the RSS 60, and the electrical conduit 250 facilitates this connection. In other embodiments, the electrical conduit 250 is configured to enable the controller 50 to communicatively couple to the drill bit, thereby transferring communication information related to the operation of the BHA 34.

Figure 7:
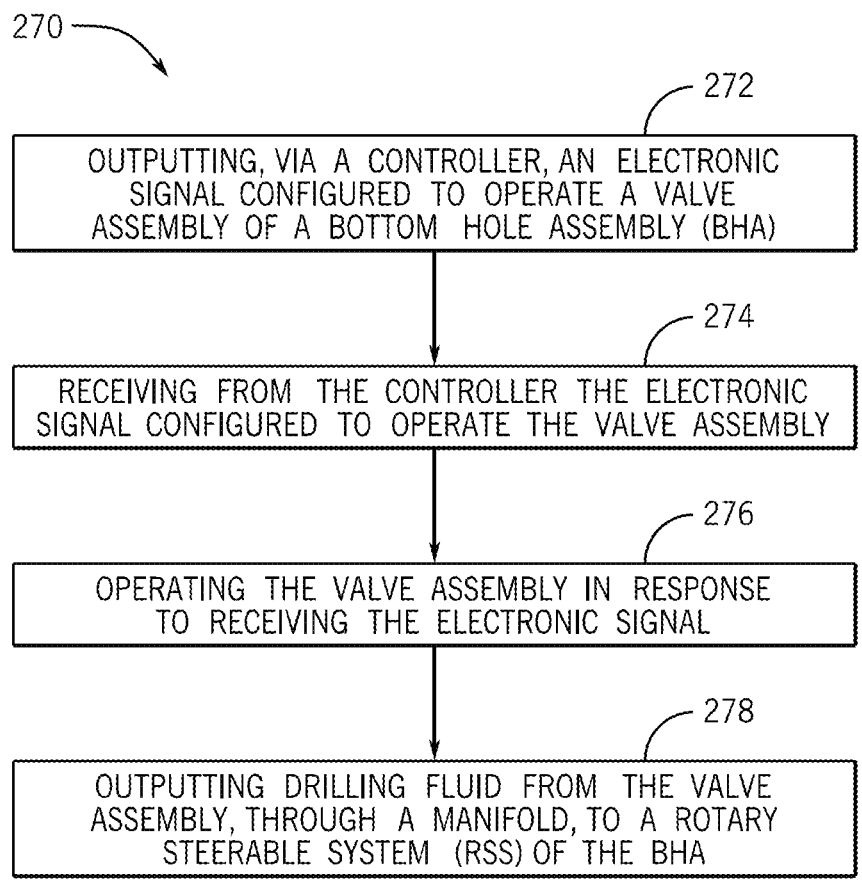
FIG. 7 is a flowchart of an embodiment of a method for arranging and operating the bistable valve in the BHA, in accordance with aspects of the present disclosure.

FIG. 7 illustrates a flowchart of an embodiment of a method 270 for operating a BHA during directional drilling operations. In particular, the method 270 operates the BHA 34 of FIGS. 1-6 to steer the drill bit 20 along a determined curved arc-shaped path for maneuverable directional drilling. The method 270 is taken in context of the BHA 34 including the controller 50, valve assembly 56, and the RSS 60. At block 272, a controller outputs an electronic signal that is configured to operate a valve assembly 56 of a BHA 34. The controller 50 may output the electronic signal at pre-determined intervals (e.g., every second, every 30 seconds, every minute, etc.). In other embodiments, the controller 50 may be configured to continuously output electronic signals to operate the valve assembly 56.

At block 274, the valve assembly 56 may receive from the controller 50 the electronic signal configured to operate the valve assembly 56. For example, the valve assembly 56 may receive the electronic signal at pre-determined intervals (e.g., every second, every 30 seconds, every minute, etc.). In other embodiments, the valve assembly 56 may be configured to continuously receive the electronic signals from the controller 50. At block 276, the valve assembly 56 may operate based on the received electronic signal from the controller 50. For example, if during directional drilling operations, the RSS 60 is cutting the curved path at an angle below a particular threshold, the controller 50 may output a control signal to increase an operating parameter (e.g., drilling fluid pressure, drilling fluid flow rate, etc.) that the steering controller is outputting to the valve assembly 56. Additionally or alternatively, if during directional drilling operations, the RSS 60 is cutting a curved path at an angle greater than a particular threshold, the controller 50 may output an electronic signal to decrease an operating parameter (e.g., drilling fluid pressure, drilling fluid flow rate, etc.) that the controller 50 is outputting to the valve assembly 56.

At block 278, the valve assembly 56 may output the drilling fluid, through a manifold, to the RSS 60 of the BHA 34. In some embodiments, the valve assembly 56 includes bistable valves 58 configured to output pressurized drilling fluid in one of two stable position configurations of the bistable valve 58. Additionally or alternatively, based on the drilling fluid output to the RSS 60, the RSS 60 may actuate fluid actuators that are coupled to individual steering pads of the RSS 60. The fluid actuators may be configured to output pressurized drilling fluid to a first side of a piston-cylinder assembly to cause a first steering pad to radially protrude from an outer circumferential surface of the RSS 60. In other embodiments, the fluid actuators may be configured to output pressurized drilling fluid to a second side of the piston-cylinder assembly to cause the first steering pad to radially retract from the outer circumferential surface of the RSS 60.

The technical effect of the disclosed embodiments includes improved steering and maneuvering of a BHA 34 via a compact in-line series arrangement of a plurality of bistable valves 58 included in a valve assembly 56 of the BHA 34, wherein each of the bistable valves 58 has a bistable actuator coupled to a valve (e.g., shuttle valve) in single-sided valve arrangement with a pressure-compensated seal. In the illustrated embodiment, the in-line series arrangement may fit within a BHA diameter threshold for a desired in-line series arrangement that falls under 2 inches (in), 2⅝ in, 3 in, 3½ in, 4 in, or otherwise suitable value. By using this in-line series arrangement, the BHA 34 can be controlled to turn with sharper turns (e.g., smaller radii of curvature), less time to make changes in direction (e.g., real-time or substantially real-time turning), and more responsive to sensed conditions in the subterranean formations 12. Additionally, the single-sided valve arrangement with the pressure-compensated seal may reduce the risk of leakage, improve the durability and performance, and improve the stability of the bistable valve 58.

The subject matter described in detail above may be defined by one or more clauses or embodiments, as set forth below.

In certain embodiments, a system includes a bottom hole assembly (BHA) having a drill bit configured to rotate and drill a borehole in a subterranean formation. The BHA further includes a rotary steerable system (RSS) having a plurality of steering pads and a plurality of fluid actuators, wherein each steering pad of the plurality of steering pads is fluidly coupled to a fluid actuator of the plurality of fluid actuators. The BHA further includes a valve assembly having a plurality of valves, wherein each valve of the plurality of valves is fluidly coupled to one of the plurality of fluid actuators. At least one valve of the plurality of valves includes a bistable actuator coupled to a stem having a valve element, wherein the bistable actuator is configured to move the stem along an axial path of travel to position the valve element in an open position or a closed position relative to a valve seat. The at least one valve also includes a pressure-compensated seal, wherein the pressure-compensated seal is disposed between an interior fluid chamber and a fluid flow path through the at least one valve.

The system of the preceding embodiment, wherein the bistable actuator includes a magnetic element coupled to the stem, a permanent magnet coupled to a housing disposed about the stem, and an electromagnet coupled to the housing disposed about the stem.

The system of any preceding embodiment, wherein the bistable actuator includes a first spring disposed in the housing, wherein the first spring is configured to enact a first axial force on the stem in a first axial direction. The bistable actuator further includes a second spring disposed in the housing, wherein the second spring is configured to enact a second axial force on the stem in a second axial direction, wherein the first axial direction and the second axial direction are opposite from each other.

The system of any preceding embodiment, wherein a controller is configured to apply a current to the electromagnet to move the stem along the axial path of travel from the open position to the closed position or from the closed position to the open position of the valve element, wherein the permanent magnet and the first and second springs are configured to balance forces to hold a first stable position for the closed position and a second stable position for the open position without the current applied to the electromagnet.

The system of any preceding embodiment, wherein the bistable actuator has a single-sided valve configuration with the stem having the valve element on only one axial end of the bistable actuator, wherein the stem extends through a bore in a first axial end of the bistable actuator to open and close the valve element relative to the valve seat, and a second axial end of the bistable actuator excludes any valve portion.

The system of any preceding embodiment, wherein the interior fluid chamber is between the pressure-compensated seal and the bistable actuator, the interior fluid chamber is a sealed volume configured to retain a lubricant at least about the stem of the bistable actuator, the pressure-compensated seal is configured to move to balance pressures of a first fluid in the interior fluid chamber and a second fluid along the fluid flow path, and the valve element is configured to control flow of the second fluid along the fluid flow path.

The system of any preceding embodiment, wherein the pressure-compensated seal includes a piston having one or more seals.

The system of any preceding embodiment, wherein the pressure-compensated seal includes a flexible barrier or diaphragm.

The system of any preceding embodiment, wherein the plurality of valves are arranged in series arrangement along a central axis of the valve assembly.

The system of any preceding embodiment, wherein the BHA includes a manifold includes a plurality of manifold passages coupled to a plurality of outlet paths of the plurality of valves, the plurality of outlets paths and the plurality of manifold passages are circumferentially spaced about the central axis, and the plurality of manifold passages is configured to direct a drilling fluid from the plurality of valves to the plurality of fluid actuators of the RSS.

The system of any preceding embodiment, including a controller configured to steer the BHA via adjustments to the plurality of steering pads via control of the RSS. The RSS includes a first steering pad fluidly coupled to a first fluid actuator, wherein the first fluid actuator is coupled to a first valve of the plurality of valves. The RSS further includes a second steering pad fluidly coupled to a second fluid actuator, wherein the second fluid actuator is coupled to a second valve of the plurality of valves. The RSS further includes a third steering pad fluidly coupled to a third fluid actuator, wherein the third fluid actuator is coupled to a third valve of the plurality of valves, wherein each of the first, second, and third valves includes an arrangement of the bistable actuator and the pressure-compensated seal.

The system of any preceding embodiment, wherein the valve seat includes a restriction flow element having a central bore, and the valve element is configured to open and close the central bore.

The system of any preceding embodiment, including a perforated wall disposed about the stem having the valve element, wherein the fluid flow path of the at least one valve extends through the perforated wall.

The system of any preceding embodiment, including a diverging annular passage downstream from the valve element along the fluid flow path of the at least one valve.

In certain embodiments, a system includes a bottom hole assembly (BHA), including at least one valve including a bistable actuator coupled to a stem having a valve element, wherein the bistable actuator is configured to move the stem along an axial path of travel to position the valve element in an open position or a closed position relative to a valve seat. The at least one valve also includes a pressure-compensated seal disposed about the stem, wherein the pressure-compensated seal is disposed between an interior fluid chamber and a fluid flow path through the at least one valve.

The system of the preceding embodiment, wherein the BHA includes a rotary steerable system (RSS) having the at least one valve.

The system of any preceding embodiment, wherein the BHA includes a plurality of valves arranged in series arrangement along a central axis, and each valve of the plurality of valves includes an arrangement of the bistable actuator and the pressure-compensated seal.

In certain embodiments, a method includes adjusting fluid flow with at least one valve of a bottom hole assembly (BHA), wherein the at least one valve includes a bistable actuator coupled to a stem having a valve element, and the bistable actuator is configured to move the stem along an axial path of travel to position the valve element in an open position or a closed position relative to a valve seat. The method further includes pressure balancing via a pressure-compensated seal, wherein the pressure-compensated seal is disposed between an interior fluid chamber and a fluid flow path through the at least one valve.

The method of the preceding embodiment, wherein adjusting the fluid flow includes actuating a rotary steerable system (RSS) of the BHA to steer drilling by a drill bit of the BHA.

The method of any preceding embodiment, wherein the BHA includes a plurality of valves arranged in series arrangement along a central axis, and each valve of the plurality of valves includes an arrangement of the bistable actuator and the pressure-compensated seal.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform] ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A system, comprising:
    a bottom hole assembly (BHA), comprising:
        a drill bit configured to rotate and drill a borehole in a subterranean formation;
        a rotary steerable system (RSS) comprising a plurality of steering pads and a plurality of fluid actuators, wherein each steering pad of the plurality of steering pads is fluidly coupled to a fluid actuator of the plurality of fluid actuators; and
        a valve assembly comprising a plurality of valves, wherein each valve of the plurality of valves is fluidly coupled to one of the plurality of fluid actuators, wherein at least one valve of the plurality of valves comprises:
            a bistable actuator coupled to a stem having a valve element, wherein the bistable actuator is configured to move the stem along an axial path of travel to position the valve element in an open position or a closed position relative to a valve seat;
            a pressure-compensated seal, wherein the pressure-compensated seal is disposed between an interior fluid chamber and a fluid flow path through the at least one valve; and
            a perforated wall disposed about the stem having the valve element, wherein the fluid flow path of the at least one valve extends through the perforated wall.

2. The system of claim 1, wherein the bistable actuator comprises a magnetic element coupled to the stem, a permanent magnet coupled to a housing disposed about the stem, and an electromagnet coupled to the housing disposed about the stem.

3. The system of claim 2, wherein the bistable actuator comprises:
    a first spring disposed in the housing, wherein the first spring is configured to enact a first axial force on the stem in a first axial direction; and
    a second spring disposed in the housing, wherein the second spring is configured to enact a second axial force on the stem in a second axial direction, wherein the first axial direction and the second axial direction are opposite from each other.

4. The system of claim 3, wherein a controller is configured to apply a current to the electromagnet to move the stem along the axial path of travel from the open position to the closed position or from the closed position to the open position of the valve element, wherein the permanent magnet and the first and second springs are configured to balance forces to hold a first stable position for the closed position and a second stable position for the open position without the current applied to the electromagnet.

5. The system of claim 4, wherein the bistable actuator has a single-sided valve configuration with the stem having the valve element on only one axial end of the bistable actuator, wherein the stem extends through a bore in a first axial end of the bistable actuator to open and close the valve element relative to the valve seat, and a second axial end of the bistable actuator excludes any valve portion.

6. The system of claim 1, wherein the interior fluid chamber is between the pressure-compensated seal and the bistable actuator, the interior fluid chamber is a sealed volume configured to retain a lubricant at least about the stem of the bistable actuator, the pressure-compensated seal is configured to move to balance pressures of a first fluid in the interior fluid chamber and a second fluid along the fluid flow path, and the valve element is configured to control flow of the second fluid along the fluid flow path.

7. The system of claim 6, wherein the pressure-compensated seal comprises a piston having one or more seals.

8. The system of claim 6, wherein the pressure-compensated seal comprises a flexible barrier or diaphragm.

9. The system of claim 1, wherein the plurality of valves are arranged in series arrangement along a central axis of the valve assembly.

10. The system of claim 9, wherein the BHA comprises a manifold comprising a plurality of manifold passages coupled to a plurality of outlet paths of the plurality of valves, the plurality of outlets paths and the plurality of manifold passages are circumferentially spaced about the central axis, and the plurality of manifold passages is configured to direct a drilling fluid from the plurality of valves to the plurality of fluid actuators of the RSS.

11. The system of claim 1, comprising a controller configured to steer the BHA via adjustments to the plurality of steering pads via control of the RSS, wherein the RSS comprises:
    a first steering pad fluidly coupled to a first fluid actuator, wherein the first fluid actuator is coupled to a first valve of the plurality of valves;
    a second steering pad fluidly coupled to a second fluid actuator, wherein the second fluid actuator is coupled to a second valve of the plurality of valves; and
    a third steering pad fluidly coupled to a third fluid actuator, wherein the third fluid actuator is coupled to a third valve of the plurality of valves, wherein each of the first, second, and third valves comprises an arrangement of the bistable actuator and the pressure-compensated seal.

12. The system of claim 1, wherein the valve seat comprises a restriction flow element having a central bore, and the valve element is configured to open and close the central bore.

13. The system of claim 1, comprising a diverging annular passage downstream from the valve element along the fluid flow path of the at least one valve.

14. A system, comprising:
    a bottom hole assembly (BHA), comprising:
        a drill bit configured to rotate and drill a borehole in a subterranean formation;
        a rotary steerable system (RSS) comprising a plurality of steering pads and a plurality of fluid actuators, wherein each steering pad of the plurality of steering pads is fluidly coupled to a fluid actuator of the plurality of fluid actuators; and
        a valve assembly comprising a plurality of valves, wherein each valve of the plurality of valves is fluidly coupled to one of the plurality of fluid actuators, wherein at least one valve of the plurality of valves comprises:

a bistable actuator coupled to a stem having a valve element, wherein the bistable actuator is configured to move the stem along an axial path of travel to position the valve element in an open position or a closed position relative to a valve seat, and wherein the bistable actuator comprises:

a magnetic element coupled to the stem;

a permanent magnet coupled to a housing disposed about the stem;

an electromagnet coupled to the housing disposed about the stem;

a first spring disposed in the housing, wherein the first spring is configured to enact a first axial force on the stem in a first axial direction; and a second spring disposed in the housing, wherein the second spring is configured to enact a second axial force on the stem in a second axial direction, wherein the first axial direction and the second axial direction are opposite from each other; and a pressure-compensated seal, wherein the pressure-compensated seal is disposed between an interior fluid chamber and a fluid flow path through the at least one valve.

15. The system of claim 14, wherein a controller is configured to apply a current to the electromagnet to move the stem along the axial path of travel from the open position to the closed position or from the closed position to the open position of the valve element, wherein the permanent magnet and the first and second springs are configured to balance forces to hold a first stable position for the closed position and a second stable position for the open position without the current applied to the electromagnet.

16. The system of claim 15 wherein the bistable actuator has a single-sided valve configuration with the stem having the valve element on only one axial end of the bistable actuator, wherein the stem extends through a bore in a first axial end of the bistable actuator to open and close the valve element relative to the valve seat, and a second axial end of the bistable actuator excludes any valve portion.

17. The system of claim 14, wherein the plurality of valves are arranged in series arrangement along a central axis of the valve assembly.

18. A system, comprising:

a bottom hole assembly (BHA), comprising:

a drill bit configured to rotate and drill a borehole in a subterranean formation;

a rotary steerable system (RSS) comprising a plurality of steering pads and a plurality of fluid actuators, wherein each steering pad of the plurality of steering pads is fluidly coupled to a fluid actuator of the plurality of fluid actuators; and a valve assembly comprising a plurality of valves, wherein each valve of the plurality of valves is fluidly coupled to one of the plurality of fluid actuators, wherein at least one valve of the plurality of valves comprises:

a bistable actuator coupled to a stem having a valve element, wherein the bistable actuator is configured to move the stem along an axial path of travel to position the valve element in an open position or a closed position relative to a valve seat; and a pressure-compensated seal, wherein the pressure-compensated seal is disposed between an interior fluid chamber and a fluid flow path through the at least one valve, wherein the interior fluid chamber is between the pressure-compensated seal and the bistable actuator, the interior fluid chamber is a sealed volume configured to retain a lubricant at least about the stem of the bistable actuator, the pressure-compensated seal is configured to move to balance pressures of a first fluid in the interior fluid chamber and a second fluid along the fluid flow path, and the valve element is configured to control flow of the second fluid along the fluid flow path.

19. The system of claim 18, wherein the pressure-compensated seal comprises a piston having one or more seals.

20. The system of claim 18, wherein the pressure-compensated seal comprises a flexible barrier or diaphragm.